United States Patent [19]
Choe et al.

[11] Patent Number: 5,654,097
[45] Date of Patent: Aug. 5, 1997

[54] HETEROFILAMENT AND FUSED CORD THEREOF

[75] Inventors: Eui Won Choe, Randolph; Charles Edward Forbes, Bridgewater, both of N.J.; Jennifer Ann Filbey, Charlotte; Stephan Fredrick Sherriff, Salisbury, both of N.C.

[73] Assignee: Hoechst Celanese Corp., Somerville, N.J.

[21] Appl. No.: 548,890

[22] Filed: Oct. 26, 1995

[51] Int. Cl.$^6$ .............................. D02G 3/00; C08L 53/00; C08L 8/30
[52] U.S. Cl. ...................... 428/373; 428/374; 525/92 F; 525/184
[58] Field of Search .................... 428/374, 373, 428/370; 525/92 F, 184

[56] References Cited

U.S. PATENT DOCUMENTS

| | | | |
|---|---|---|---|
| 3,645,819 | 2/1972 | Fijhi et al. | 156/148 |
| 4,101,605 | 7/1978 | Gergen et al. | 525/92 F |
| 4,111,890 | 9/1978 | Gergen et al. | 525/92 F |
| 4,301,255 | 11/1981 | Korpman | 525/92 F |
| 4,544,703 | 10/1985 | Haaf | 525/92 D |
| 4,871,799 | 10/1989 | Kobayashi et al. | 525/92 F |
| 4,935,297 | 6/1990 | Yotsumoto et al. | 428/288 |
| 5,041,499 | 8/1991 | Blakely | 525/92 F |
| 5,171,633 | 12/1992 | Muramoto et al. | 428/373 |
| 5,308,697 | 5/1994 | Muramoto et al. | 428/374 |
| 5,352,518 | 10/1994 | Muramoto et al. | 428/373 |
| 5,376,721 | 12/1994 | McGarry et al. | 525/92 F |
| 5,464,695 | 11/1995 | Kawamoto et al. | 428/370 |

FOREIGN PATENT DOCUMENTS

| | | | |
|---|---|---|---|
| 1199115 | 7/1970 | United Kingdom | D01F 7/04 |
| 1316259 | 5/1973 | United Kingdom | D01F 7/28 |

*Primary Examiner*—Newton Edwards
*Attorney, Agent, or Firm*—Michael W. Ferrell

[57] ABSTRACT

Bilayer filaments and fused cords thereof are described. The product is particularly useful for tire cord and filaments include a core of a partially crystalline, oriented polymer and a shell or sheath formed of a blend of rubber and a relatively low melting polymer. A particularly preferred embodiment includes a poly(ethylene terephalate) core as well as a sheath of copolyester blended with poly(styrene-elastomer-styrene) elastomer.

10 Claims, 3 Drawing Sheets

HETEROFILAMENT AND FUSED CORD THEREOF

CROSS REFERENCE TO RELATED CASES

The subject matter of this application relates to the subject matter of the following cases being filed concurrently herewith:

1. Attorney Docket No. 1528, entitled RUBBER-POLYESTER COMPOSITES INCLUDING A SIDECHAIN CONTAINING COPOLYESTER.
2. Attorney Docket No. 1529, entitled RUBBER-POLYESTER COMPOSITES INCLUDING A FUNCTIONALLY TERMINATED COPOLYESTER.
3. Attorney Docket No. 1530, entitled RUBBER-POLYESTER COMPOSITES INCLUDING POLYSTYRENE-POLYESTER COPOLYMERS.

TECHNICAL FIELD

The present invention relates generally to bilayer filaments for rubber reinforcement and in preferred embodiments to multifilament fused cord for use in tire manufacture. Particularly preferred embodiments include filaments with a poly(ethylene terephthalate) core and a sheath formed of a blend of a poly(butylene terephalate) copolyester and a poly(styrene-elastomer-styrene) elastomer, while other combinations within the spirit and scope of the present invention are hereafter described and claimed.

BACKGROUND

Non-metallic fibers useful for rubber reinforcement and especially for tire reinforcement include relatively high denier nylons, rayon, as well as polyester. A particularly preferred polyester is poly(ethylene terephthalate). Because mechanical properties are important, it is typical to employ yarns made up of highly oriented filament which may be prepared in a variety of ways. With respect to poly(ethylene terephthalate) one process involves spinning the yarn to a relatively low birefringence (<0.009) and then drawing the yarn. For example see: U.S. Pat. Nos. 3,216,187 or 3,361,859. Another process involves spinning the yarn to a relatively higher birefringence (i.e. 0.009) and drawing off-line. For example see: U.S. Pat. No. 4,973,657. Another process involves spinning the yarn and subsequently draw-twisting the yarn. The preferred process involves spinning the yarn to a relatively high birefringence (i.e. 0.009) and drawing in-line. For example see: U.S. Pat. Nos. 4,101,525; 4,195,052, 4,414,169; 4,690,866; 4,551,172; 4,827,999; 4,491,657, 5,067,538, 5,132,067; and 5,234,764. Preparation of the yarn is merely the first step, since the yarns must be suitably adhered to the rubber components in order to impart the desired properties to the end product.

In connection with tire manufacture, it is typical to manufacture specialized fabrics which are coated with rubber for use in plies, breakers, chippers and belts. Initial manufacture consists of spinning and drawing the yarns as noted above as well as applying a finish. The yarn is twisted into plies, cabled into cords, woven into fabrics, and treated with an adhesive dip prior to being coated with rubber. To facilitate processing with adhesives and calendaring with rubber, the cables are woven into a fabric, for example of 23-35 ends per inch with a minimum number of filament yarns or staple fiber pick threads, also called fill threads or weft. The fabric is dip-coated with an adhesive which bonds with rubber. The adhesives are most commonly aqueous systems including rubber latex, resorcinol and formaldehyde which are allowed to partially react before dip application.

The multi-step yarn pre-treatment process involved in tire manufacture is of course expensive, both in terms of capital expenditure and processing costs; especially in connection with weaving, adhesive application, and environmental control costs, which expenses are interrelated inasmuch as the weaving step is required in large part to facilitate adhesive application.

Bilayer spinning of synthetic fibers has been employed to provide fibers with a surface layer more suitable for a given end use. Rayon/nylon bicomponent fibers are shown, for example, in U.S. Pat. No. 5,272,005; while U.S. Pat. No. 5,227,109 discloses bicomponent fibers with a poly(ethylene terephthalate) core and a copolyester sheath. Perhaps more notably, U.S. Pat. No. 4,987,030 shows a polyester core/nylon sheath bicomponent fiber useful as rubber reinforcement. Additional multilayer fibers and cords may be seen in the following U.S. Pat. Nos.: 4,520,066; 4,129,692; 4,024,895; 3,839,140; 3,645,819.

SUMMARY OF INVENTION

There is provided in accordance with the present invention a bilayer filament for industrial yarns having a core formed of a thermoplastic fiber-forming core polymer selected from the group consisting of polyesters and polyamides and a thermoplastic sheath concentrically disposed about the core and adhered thereto. The thermoplastic sheath includes a rubber blended with a thermoplastic sheath polymer, with the proviso that when the core polymer is a polyester the sheath polymer is a polyester which is fully melted at a temperature at least 5° C. lower than the crystalline melting point of the core polymer and when the core polymer is a polyamide, the sheath polymer is a polyamide which is fully melted at a temperature at least 5° C. lower than the crystalline melting point of the core polymer. Generally, the sheath polymer is fully melted from 5° C. to 150° lower than the crystalline melting point of said core polymer and typically from 10° C. to 100° C. lower. In some preferred embodiments, the sheath polymer is fully melted from 15° C. to 50° C. lower than the crystalline melting point of the core polymer.

The fiber-forming core polymer, is a partially crystalline fiber-forming polymer with a well defined crystalline melting point. The sheath polymer may be partially crystalline or wholly amorphous, that is, without a well defined melting point so long as it is fully melted below the crystalline melting point of the core polymer material. By fully melted, it is meant that the sheath material will readily flow under mild shear and will readily melt fuse under mild pressure. This is an important feature when a fused cord is desired, that is, so the filaments may be fused without thermally relaxing orientation present in the core which may have been imparted for example, by high stress melt spinning or post-solidification drawing at elevated temperatures. The sheath may be a copolyester blended with an elastomer, a blend of copolyesters with an elastomer and may include some core polymers if so desired, so long as the core and sheath of the filament exhibit the basic and novel characteristics of the invention, that is the melt characteristics recited in this section, including the melting relationship described above between at least one core polymer and at least one sheath polymer. Likewise, the core may contain additional components so long as it contains a fiber forming core polymer with a crystalline melting point higher than the temperature at which a sheath polymer is fully melted.

While a variety of polymers may be used for the core, particularly preferred polyamides include polymers of caprolactam (nylon 6) as well as polymers of adipic acid and hexamethylene diamine (nylon 6,6). Polyamides of terephthalic acid and 2-methyl-1,5-pentane diamine may also be used. Of the various polyesters, poly(ethylene terephthalate) is most preferred.

Likewise, numerous rubber/polymer melt blends may be used as the sheath. Poly(styrene-elastomer-styrene) or poly(styrene-elastomer) elastomers blended with a sheath polymer having recurring units similar or identical to those of the core polymers are most preferred. For instance, both core and sheath polymers including a polyester of an alkyl glycol and an aromatic diacid is a particularly preferred combination.

In a further aspect of the invention, a fused cord of the filaments described above is provided. The filaments of the present invention are useful in a variety of products in addition to tires, for example short cut reinforced rubbers and polymers, V-belts, conveyor belts and so on.

BRIEF DESCRIPTION OF THE DRAWINGS

The invention is described in detail below in connection with various synthetic examples and drawings. In the drawings.

DETAILED DESCRIPTION

The present invention is described in detail below in connection with numerous examples which are provided for purposes of illustration only and are not intended to limit the invention in any way, which invention is defined in the appended claims. The core or sheath polymer may be a polyester of different molecular weights for example, depending on the desired properties. Polyesters may be prepared from the dimethyl esters of an aromatic diacid and a glycol or directly from the acid and the glycol if so desired. If a particularly high molecular weight product is desired, it is customary to subject an intermediate or high molecular weight polyester product to solid state polymerization under vacuum or in an inert atmosphere.

Linear polyesters which may be employed as the core polymer in practicing the present invention include polyester of alkyl glycols and aromatic acids such as: poly(alkylene terephthalates) having the repeating unit where X=2–10 and preferably 2–4 and n is an integer throughout this section; copolymers including (alkylene isophthalates) having the repeating unit where X=2–6 and preferably 2 or 4; poly(alkylene 4,4'bibenzoates) having the repeating unit where X=2–10 with X=2–6 being preferred; poly(alkylene 2,6 naphthalene-dicarboxylates) having the repeating unit where X=2–10 and preferably 2–4; poly(alkylene sulfonyl-4,4'-dibenzoates having the repeating unit where X=2–10, preferably 2–6; poly(p-phenylene alkylene dicarboxylates) having the repeating unit where X=1–8 and preferably 1–4; Poly(p-xylylene aklylene dicarboxylates) having the repeating unit:

where X=1–10 and preferably 2; as well as Poly(p-phenylene dialkylene terephthalates) having the repeating unit where X=1–5 and preferably 1, 2 and 4.

As will be appreciated by those of skill in the art, the foregoing list is by no means exhaustive and it is sometimes desired to employ terepolymers and linear polyesters with even more monomers. Particularly desirable terepolymers might include poly(alkylene terephthalate-co-4, 4'bibenzoate), and poly(alkylene 4,4'-bibenzoate co-2,6 naphthalene dicarboxylates). These polymers are disclosed in U.S. Pat. Nos. 3,008,934, 4,082,731 and 5,453,321 as well as European Application No. 0 202 631. The molecular weight, spinning, drawing fibers and the like will depend on the desired end-use of the product.

So also, other monomeric components may be utilized in the sheath or core polymers. Cyclohexanedimethanol, available from Eastman Chemical Company may be used in polyesters or polyamides in accordance, with the present invention. Cyclohexanedimethanol may be employed in the cis or trans form.

Any suitable, melt processable rubber may be employed in the sheath, such as natural rubber, synthetic 1,4-polyisoprene, polybutadiene rubber, poly(butadiene-co-styrene), poly(isobutylene-co-isoprene), poly(ethylene-co-propylene-co-diene), styrene-isoprene and the like if the rubber is melt-processable under the conditions of interest. Particularly preferred rubbers are block copolymer rubbers, also referred to as thermoplastic elastomers herein and further described below. Ethylene-propylene rubbers (EPR) or ethylene-propylene-diene monomer (EPDM) rubbers are important commercial materials which may also be employed under suitable conditions.

Generally speaking, the thermoplastic elastomers useful in connection with the present invention are multiphase compositions in which the phases are intimately dispersed. In many cases, the phases are chemically bonded by block or graft copolymerization. In others, a fine dispersion is apparently sufficient. At least one phase consists of a material that is hard at room temperature but fluid upon heating. Another phase consists of a softer material that is rubberlike at room temperature. A simple structure is an A-B-A block copolymer, where A is a hard phase and B an elastomer or soft phase, eg, poly(styrene-elastomer-styrene).

Most polymers are thermodynamically incompatible with other polymers, and mixtures separate. This is true even when the polymeric species are pan of the same molecule, as in these block copolymers. With respect to poly(styrene-elastomer-styrene) copolymers, the polystyrene and segments form separate regions, ie, domains, dispersed in a continuous elastomer phase. At room temperature, these polystyrene domains are hard and act as physical cross-links, tying the elastomer chains together in a three-dimensional network. In some ways, this is similar to the network formed by vulcanizing conventional rubbers using sulfur cross-links. The main difference is that in thermoplastic elastomers, the domains lose their strength when the material is heated or dissolved in solvents. This allows the polymer or its solution to flow. When the material is cooled down or the solvent is evaporated, the domains harden and the network regains its original integrity. This explanation of the properties of thermoplastic elastomers has been given in terms of a poly(styrene-elastomer-styrene) block copolymer, but it would apply to any block copolymer with the structure A-B-A; A-B diblock or (A-B)$_n$ repeating block polymers or multiblock. In principle, A can be any polymer normally regarded as a hard thermoplastic, eg, polystyrene, poly (methyl methacrylate), polypropylene, and B can be any polymer normally regarded as elastomeric, eg, polyisoprene, polybutadiene, polyisobutylene, polydimethylsiloxane (see Table 1). Note also that a styrene-ethylene butylene-styrene (SEBS) saturated elastomer type polymer may be used in connection with the present invention.

TABLE 1

| THERMOPLASTIC BLOCK COPOLYMERS | | |
|---|---|---|
| Hard segment, A | Soft or elastomeric segment, B | Typical Structure |
| polystyrene | polybutadiene, polyisoprene | A-B-A |
| poly(α-methylstyrene) | polybutadiene, polyisoprene | A-B-A |
| polystyrene | poly(ethylene-co-butylene) | A-B-A |
| polyethylene | poly(ethylene-co-butylene) | A-B-A |
| polystyrene | polydimethylsiloxane | A-B-A |
| poly(α-methylstyrene) | polydimethylsiloxane | A-B-A and (A-B)$_n$ |
| polysulfone | polydimethylsiloxane | (A-B)$_n$ |
| poly(silphenylene siloxane) | polydimethylsiloxane | (A-B)$_n$ |
| polyurethane | polyester or polyether | (A-B)$_n$ |
| polyester | polyether | (A-B)$_n$ |
| polycarbonate | polydimethylsiloxane | (A-B)$_n$ |
| polycarbonate | polyether | (A-B)$_n$ |

The three commercially important block copolymers are poly(styrene-elastomer-styrene), thermoplastic polyurethanes, and thermoplastic polyesters.

Particularly preferred commercially available block copolymer thermoplastic elastomers appear in Table 2 below.

TABLE 2

| TRADE NAMES AND MANUFACTURERS OF THERMOPLASTIC ELASTOMERS | | | | |
|---|---|---|---|---|
| Trade Name | Manufacturer | Type | Hard segment | Soft segment |
| Kraton D | Shell Chemical Co. | triblock (S-B-S or S-I-S) | S | B or I |
| Solprene 400 | Phillips Petroleum Co. | branched (S-B)$_n$ (S-I)$_n$ | S | B or I |
| Stereon | Firestone Co. | triblock (S-B-S) | S | B |
| Tufprene | Asahi | triblock (S-B-S) | S | B |
| Europrene SOL T | Enichem | triblock (S-B-S) or (S-I-S) | S | B or I |
| Kraton G | Shell Chemical Co. | triblock (S-EB-S) | S | EB |
| Elexar | Shell Chemical Co. | triblock (S-EB-S) and (S-B-S) | S | EB or B |
| Riteflex | Hoechst Celanese | | polyester | polyether |

S = Polystyrene; B = Polybutadiene
I = Polyisoprene,
EB = Poly(ethylene-co-butylene)

Riteflex is a multiblock (A-B)$_n$ type elastomer wherein, A the hard segment is poly(butylene terephthalate) and B, the soft segment is poly(tetramethylene ether).

Rubbers useful in connecting with the present invention are those which are easily melt-processed with the sheath and core polymers, for example, which may be melt blended and co-extruded with a polyester forming the sheath of a heterofilament. Rubbers such as natural rubber or synthetic cis-isoprene rubber may be employed provided they have suitable flow characteristics.

Especially preferred thermoplastic elastomers are the styrene-elastomer-styrene block copolymers described above.

The thermoplastic sheath polymers are preferably selected from those polymers which promote compatibility between the core polymer and the rubber in the sheath. Particularly preferred sheath polymers include sidechain containing copolyesters, styrene containing copolyesters, maleic acid terminated copolyesters, isocyanate terminated copolyesters and the like. In all cases these polymers are fully melted at least 5° C. degrees lower than the crystalline melting point of the core polymer, 5° C. to 200° C. lower being typical. A 10° to 100° C. degree difference is more typical as is 15° C. to 50° C. A melting point of the sheath polymer being at least 30° C. lower than the melting point of the core polymer is preferred in most cases. Particular sheath polymers are set forth in Examples 1–20 hereinbelow.

EXAMPLE 1

Sidechain Containing Copolyester

In a 1 liter three-necked resin flask equipped with nitrogen inlet and outlet, thermometer, condenser and mechanical stirrer, were placed 388 grams (2 moles) of dimethyl terephthalate, 399.6 grams (4.44 moles) of 1,4-butanediol, 23.39 grams (0.16 moles) of 1,2-octanediol and 0.346 grams of titanium isopropoxide. The mixture was heated at 210° C. for 2 hours while distilling out methanol. The resulting mixture was heated to 250° C. for 30 minutes and then vacuum was applied for 4 hours. The resulting polymer was cooled to room temperature to obtain copolyester with an intermediate molecular weight, I.V. 1.2 dl/g as determined at 25 degrees and 0.1% concentration in HFIP/PFP 50/50. Tmp 222° C. (by DSC); heat of fusion 44 j/g. This copolyester has the structure:

where x:y=92:8, n=4, and m=5.

The fiber properties of drawn single-filament are denier/tenacity/elongation/modulus 37.7/4.7 gpd/23%/31 gpd. The inherent viscosity was increased to 1.8 dL/g by solid state polymerization at 200° for 20 hours under vacuum.

EXAMPLE 2

Sidechain Containing Copolyester

In a 1 liter three-necked resin flask equipped with nitrogen inlet and outlet, thermometer, condenser and mechanical stirrer, were placed 388 grams (2 moles) of dimethyl terephthalate, 41.34 grams (0.16 moles) of 1,2-hexadecanediol and 0.346 grams titanium tetraisopropoxide. The mixture was heated at 210° C. for 2 hours while distilling out methanol. To the reaction flask, was added 399.6 grams (4.44 moles) of 1,4-butanediol. The resulting mixture was heated at 210° C. for 2 more hours and then at 250° C. for 30 minutes, and then vacuum was applied for 6 hours. The resulting polymer was cooled to room temperature to obtain copolyester with an intermediate molecular weight, I.V. 0.98 dL/g as determined at 25 degrees and 0.1% concentration in HFIP/PFP 50/50: Tmp 215° C. (by DSC); heat of fusion 33 j/g. This copolyester has the structure:

where x:y=92:8, n=4, and m=13.

The inherent viscosity was increased to 1.35 d/L/g by solid state polymerization at 200° C. for 20 hours under vacuum. This polymer was spun at 283° C. and drawn at a draw ratio of 6.8 to obtain fiber properties of denier grams/tenacity, gpd/elongation, %/modulus, gpd, 66/0.77/479/13.7 as spun and 9.7/7.7/17/30.2 after drawing.

EXAMPLE 3

Sidechain Containing Copolyester

In a 1 liter three-necked resin flask equipped with nitrogen inlet and outlet, thermometer, condenser and mechanical stirrer, were placed 194 grams (1 moles) of dimethyl terephthalate, 64.60 grams (0.25 moles) of 1,2 hexadecanediol and 0.173 grams of titanium tetraisopropoxide. The mixture was heated at 210° C. for 2 hours while distilling out methanol. To the reaction flask, was added 184.5 grams (2.05 moles) of 1,4-butanediol. The resulting mixture was heated at 210° C. for 2 more hours and then at 250° C. for 30 minutes, and then vacuum was applied for 6 hours. The resulting polymer was cooled to room temperature to obtain copolyester with an intermediate molecular weight, I.V. 0.64 dL/g as determined at 25 degrees and 0.1% concentration in HFIP/PFP 50/50: Tmp 191° C. (by DSC); heat of fusion 26 j/g; Tg 41° C. The polymer was spinnable and the resulting fiber was drawable.

This copolyester product has the structure:

where x:y=75:25, n=4, and m=13.

EXAMPLE 4

Sidechain Containing Copolyester

In a 1 liter three-necked resin flask equipped with nitrogen inlet and outlet, thermometer, condenser and mechanical stirrer, were placed 194 grams (1 moles) of dimethyl terephthalate, 129.20 grams (0.5 moles) of 1,2 hexadecanediol and 0.173 grams of titanium tetraisopropoxide. The mixture was heated at 210° C. for 2 hours while distilling out methanol. To the reaction flask, was added 162.2 grams (1.8 moles) of 1,4-butanediol. The resulting mixture was heated at 210° C. for 2 more hours and then at 250° C. for 30 minutes, and then vacuum was applied for 7.5 hours. The resulting polymer was cooled to room temperature to obtain copolyester with an intermediate molecular weight, I.V. 0.25 dL/g as determined at 25 degrees and 0.1% concentration in HFIP/PFP 50/50: Tmp 149° C. (by DSC); heat of fusion 25 j/g; Tg −13° C.

The copolyester product has the structure:

where x:y=50:50, n=4, and m=13.

EXAMPLE 5

Sidechain Containing Copolyester

In a 1 liter three-necked resin flask equipped with nitrogen inlet and outlet, thermometer, condenser and mechanical stirrer, were placed 24.92 grams (0.15 moles) of isophthalic acid, 141.2 grams (0.85 moles) of terephthalic acid, 175.95 grams (1.95 moles) of 1,4-butanediol, 53.48 grams (0.15 moles) of Monoolein. The mixture was heated at 220° C. for 1 hour while distilling out water. The temperature of the resulting mixture was raised to a maximum of 275° C. at a rate of 10° C. per hour, and then vacuum was applied for 1.5 hours. The resulting polymer was cooled to room temperature to obtain copolyester with an intermediate molecular weight, I.V. 0.92 dL/g as determined at 25 degrees and 0.1% concentration in HFIP/PFP 50/50: Tmp 138° C. (by DSC); heat of fusion 6 j/g.

This copolyester has the general structure:

Where x:y=85:15, p:m=85:15, and n=4; and where p and m indicate a meta and para linkage respectively. The meta linkage is achieved by using isophathalic acid whereas the para linkage is achieved by using terephathalic acid.

EXAMPLE 6

Sidechain Containing Copolyester

In a 1 liter three-necked flask equipped with nitrogen inlet and outlet, thermometer, condenser and mechanical stirrer, were placed 24.9 grams (0.15 moles) of isophthalic acid, 141.2 grams (0.85 moles) of terephthalic acid, 155.25 grams (1.725 moles) of 1,4-butanediol, 89.14 grams (0.25 moles) of Monoolein. The mixture was heated at 220° C. for one hour while distilling the water. The temperature of the resulting mixture was raised to a maximum of 275° C. at a rate of 10° C. per hour, and then vacuum was applied for 2 hours. The resulting polymer was cooled to room temperature to obtain copolyester with an intermediate molecular weight: Tmp 138° C. (by DSC); heat of fusion 5 j/g.

This copolyester has the general formula:

where x:y=75:25, p:m=85:15, and n=4; and p and m are defined as above.

EXAMPLE 7

Sidechain Containing Copolyester

In a 1 liter three-necked flask equipped with nitrogen inlet and outlet, thermometer, condenser and mechanical stirrer, were placed 241.53 grams (0.25 moles) of isophthalic acid, 124.59 grams (0.75 moles) of terephthalic acid, 155.25 grams (1.725 moles) of 1,4-butanediol, 89.14 grams (0.25 moles) of Monoolein. The mixture was heated at 220° C. for one hour while distilling the water. The temperature of the resulting mixture was raised to a maximum of 275° C. at a rate of 10° C. per hour, and then vacuum was applied for 3 hours. The resulting polymer was cooled to room temperature to obtain copolyester with an intermediate molecular weight I.V. 0.80 dL/g as determined at 25 degrees and 0.1% concentration in HFIP/PFP 50/50: Softening point 125° C.; Tg −9° C.; heat of fusion 0 j/g.

This copolyester has the general formula:

where x:y=75:25, p:m=75:25, and n=4 and terms are defined as above.

EXAMPLE 8

Maleic Acid Terminated Copolyester

In a 1 liter three-necked resin flask equipped with nitrogen inlet and outlet, thermometer, condenser and mechanical stirrer, were placed 194 grams (1 moles) of dimethyl terephthalate, 207 grams (2.3 moles) of 1,4 butanediol, 0.173 grams titanium tetraisopropoxide. The mixture was heated at 210° C. for 2 hours while distilling out methanol. The resulting mixture was heated to 250° C. for 30 minutes, and then vacuum was applied for 2 hours. After vacuum was released and replaced with nitrogen, maleic anhydride (9.02 grams, 0.092 moles) was added into the flask. The resulting polymer was stirred for 45 minutes at 250° C., and then was cooled to room temperature to obtain maleic acid terminated copolyester with an intermediate molecular weight, I.V. 0.57 dL/g as determined at 25° C. and 0.1% concentration in HFIP/PFP 50/50; Tmp 223° C. by DSC; heat of fusion 48 j/g; Tg 47° C.

EXAMPLE 9

Maleic Acid Terminated Copolyester

In a 1 liter three-necked resin flask equipped with nitrogen inlet and outlet, thermometer, condenser and mechanical stirrer, were placed 194 grams (1 moles) of dimethyl terephthalate, 207 grams (2.3 moles) of 1,4-butanediol and 0.173 grams of titanium tetraisopropoxide. The mixture was heated at 210° C. for 2 hours while distilling out methanol. The resulting mixture was heated at 250° C. for 30 minutes, and then vacuum was applied for 3 hours. After vacuum was released and replaced with nitrogen, maleic anhydride (3.08 grams, 0.0314 moles) was added into the flask. The resulting polymer was stirred for 10 minutes at 250° C., and then was cooled to room temperature to obtain maleic acid terminated copolyester with an intermediate molecular weight, I.V. 0.66 dL/g as determined at 25° C. and 0.1% concentration in HFIP/PFP 50/50: Tmp 224° C. (by DSC); heat of fusion 41 j/g; Tg 55° C.

EXAMPLE 10

Isocyanate Terminated Copolyester

In a 1 liter three-necked resin flask equipped with nitrogen inlet and outlet, thermometer, condenser and mechanical stirrer, were placed 194 grams (1 moles) of dimethyl terephthalate, 207 grams (2.3 moles) of 1,4-butanediol and 0.173 grams of titanium tetraisopropoxide. The mixture was heated at 210° C. for 2 hours while distilling out methanol. The resulting mixture was heated at 250° C. for 30 minutes, and then vacuum was applied for 2 hours. After vacuum was released and replaced with nitrogen, 2,4-toluenediisocyanate (16.02 grams, 0.092 moles) was added into the flask. The resulting polymer was stirred for 40 minutes at 250° C., and then was cooled to room temperature to obtain phenyl isocyanate terminated copolyester with an intermediate molecular weight, I.V. 1.18 dL/g as determined at 25° C. and 0.1% concentration in HFIP/PFP 50/50; Tmp 220° C.; heat of fusion 38 j/g; Tg 55° C.

EXAMPLE 11

Isocyanate Terminated Copolyester

In a 1 liter three-necked resin flask equipped with nitrogen inlet and outlet, thermometer, condenser and mechanical stirrer, were placed 194 grams (1 moles) of dimethyl terephthalate, 207 grams (2.3 moles) of 1,4-butanediol and 0.173 grams of titanium tetraisopropoxide. The mixture was heated at 210° C. for 2 hours while distilling out methanol. The resulting mixture was heated at 250° C. for 30 minutes, and then vacuum was applied for 3 hours. After vacuum was released and replaced with nitrogen, 2,4-toluenediisocyanate (5.48 grams, 0.0314 moles) was added into the flask. The resulting polymer was stirred for 10 minutes at 250° C., and then was cooled to room temperature to obtain phenyl isocyanate terminated copolyester with an intermediate molecular weight, I.V. 1.98 dL/g as determined at 25° C. and 0.1% concentration in HFIP/PFP 50/50; Tmp 220° C.; heat of fusion 37 j/g; Tg 47° C.

EXAMPLE 12

Preparation of Dimethyl Ester of Polystyrene Grafted Succinic Acid

Ten grams of dimethyl fumarate or dimethyl maleate and 0.5 grams of benzoyl peroxide were dissolved in 100 grams of styrene. The resulting mixture was heated at 95° C. for 4 hours. The product is dimethyl ester of polystyrene grafted succinic acid having an average number of styrene unit of 7, and had a melting range from 65°–80° C.; soluble in chloroform.

EXAMPLE 13

Preparation of Dimethyl Ester of Polystyrene Grafted Succinic Acid

Ten grams of dimethyl fumarate or dimethyl maleate and 1.0 grams of benzoyl peroxide were dissolved in 200 grams of styrene. The resulting mixture was heated at 95° C. for 16 hours. The product is dimethyl ester of polystyrene grafted succinic acid having an average number of styrene unit of 14, and had a melting range from 65°–80° C.; soluble in chloroform.

EXAMPLE 14

Polystyrene Grafted Copolyester

In a 1 liter three-necked resin flask equipped with nitrogen inlet and outlet, thermometer, condenser and mechanical stirrer, were placed 183.52 grams (0.946 moles) of dimethyl terephthalate, 103.71 grams (0.054 moles) of dimethyl ester of polystyrene grafted succinic acid as prepared according to Examples 12 (fumarate variant) and 13, 207 grams (2.3 moles) of 1,4-butanediol, and 0.173 grams of titanium tetraisopropoxide. The mixture was heated at 210° C. for 2 hours while distilling out methanol. The resulting mixture was heated to 250° C. for 30 minutes and then vacuum was applied for 4.5 hours. The resulting polymer was cooled to room temperature to obtain polystyrene grafted copolyester with an intermediate molecular weight, I.V. 0.55 dL/g as determined at 25° C. and 0.1% concentration in HFIP/PFP 50/50; heat of fusion 25 j/g; Tg's 45 and 103° C. This polymer contained 30% of polystyrene.

EXAMPLE 15

Preparation of Polystyrene Grafted Copolyester

In a 1 liter three-necked resin flask equipped with nitrogen inlet and outlet, thermometer, condenser and mechanical stirrer, were placed 188.76 grams (0.946 moles) of dimethyl terephthalate, 51.85 grams (0.027 moles) of dimethyl ester of polystyrene grafted succinic acid as prepared according to Example 12, 207 grams (2.3 moles) of 1,4-butanediol, and 0.173 grams of titanium tetraisopropoxide. The mixture was heated at 210° C. for 2 hours while distilling out methanol. The resulting mixture was heated to 250° C. for 30 minutes and then vacuum was applied. The reaction temperature was raised to 270° C., and the resulting mixture was polymerized at that temperature for 2 hours. The resulting polymer was cooled to room temperature to obtain polystyrene grafted copolyester with an intermediate molecular weight, Tmp 223° C. (by DSC); heat of fusion 32 j/g; Tg's 45 and 107° C. This polymer contained 15% of polystyrene.

EXAMPLE 16

Preparation of Polystyrene Grafted Copolyester

In a 1 liter three-necked resin flask equipped with nitrogen inlet and outlet, thermometer, condenser and mechanical stirrer, were placed 183.52 grams (0.946 moles) of dimethyl terephthalate, 103.71 grams (0.054 moles) of dimethyl ester of polystyrene grafted succinic acid as prepared according to Example 12, 207 grams (2.3 moles) of 1,4-butanediol, and 0.173 grams of titanium tetraisopropoxide. The mixture was heated at 210° C. for 2 hours while distilling out methanol. The resulting mixture was heated to 250° C. for 30 minutes and then vacuum was applied. The reaction temperature was raised to 270° C., and the resulting mixture was polymerized at that temperature for 2 hours. The resulting polymer was cooled to room temperature to obtain polystyrene grafted copolyester with an intermediate molecular weight, Tmp 223° C. (by DSC); heat of fusion 28 j/g; Tg's 41 and 105° C. This polymer contained 30% of polystyrene.

EXAMPLE 17

Preparation of Polystyrene Grafted Copolyester

In a 1 liter three-necked resin flask equipped with nitrogen inlet and outlet, thermometer, condenser and mechanical stirrer, were placed 194 grams (1 moles) of dimethyl terephthalate, 103.71 grams (0.027 moles) of dimethyl ester of polystyrene grafted succinic acid as prepared according to Example 13, 207 grams (2.3 moles) of 1,4-butanediol, and 0.173 grams of titanium tetraisopropoxide. The mixture was heated at 210° C. for 2 hours while distilling out methanol. The resulting mixture was heated to 250° C. for 30 minutes and then vacuum was applied. The reaction temperature was raised to 275° C., and the resulting mixture was polymerized at that temperature for 3.5 hours. The resulting polymer was cooled to room temperature to obtain polystyrene grafted copolyester with an intermediate molecular weight, I.V. 0.58 dL/g as determined at 25° C. and 0.1% concentration in HFIP/PFP 50/50: Tmp 223° C. (by DSC); heat of fusion 30 j/g; Tg's 48 and 105° C. This polymer contained 30% of polystyrene with an average styrene unit of 14 and was fiber forming.

EXAMPLE 18

Preparation of Polystyrene Grafted Copolyester

In a 1 liter three-necked resin flask equipped with nitrogen inlet and outlet, thermometer, condenser and mechanical stirrer, were placed 194 grams (1 moles) of dimethyl terephthalate, 51.85 grams (0.0135 moles) of dimethyl ester of polystyrene grafted succinic acid as prepared according to Example 13, 207 grams (2.3 moles) of 1,4-butanediol, and 0.173 grams of titanium tetraisopropoxide. The mixture was heated at 210° C. for 2 hours while distilling out methanol. The resulting mixture was heated to 250° C. for 30 minutes and then vacuum was applied. The reaction temperature was raised to 275° C., and the resulting mixture was polymerized at that temperature for 4 hours. The resulting polymer was cooled to room temperature to obtain polystyrene grafted copolyester with an intermediate molecular weight, I.V. 0.84 dL/g as determined at 25° C. and 0.1% concentration in HFIP/PFP 50/50: Tmp 223° C. (by DSC); heat of fusion 34 j/g; Tg's 45 and 106° C. This polymer contained 15% of polystyrene with an average styrene unit of 14 and was fiber forming.

EXAMPLE 19

Preparation of Poly(Styrene/Maleic Anhydride Grafted) Copolyester

In a 1 liter three-necked resin flask equipped with nitrogen inlet and outlet, thermometer, condenser and mechanical stirrer, were placed 194 grams (1 moles) of dimethyl terephthalate, 207 grams (2.3 moles) of 1,4-butanediol, and 0.173 grams of titanium tetraisopropoxide. The mixture was heated at 210° C. for 2 hours while distilling out methanol. The resulting mixture was heated to 250° C. for 30 minutes and then vacuum was applied for 3 hours. After vacuum was released and replaced with nitrogen, styrene/maleic anhydride copolymer with 75% styrene content and number average molecular weight of 1900 (51.76 grams) was added into the flask. The resulting polymer was stirred for 75 minutes at 250° C., and then was cooled to room temperature to obtain polystyrene/maleic anhydride grafted copolyester with an intermediate molecular weight, I.V. 0.43 dL/g as determined at 25° C. and 0.1% conc. in HFIP/PFP 50:50; Tmp 222° C. (by DSC); heat of fusion 36 j/g; Tg 60° C. This polymer contained 15% of polystyrene.

EXAMPLE 20

Preparation of Poly(Styrene/Maleic Anhydride Grafted) Copolyester

In a 1 liter three-necked resin flask equipped with nitrogen inlet and outlet, thermometer, condenser and mechanical stirrer, were placed 194 grams (1 moles) of dimethyl terephthalate, 207 grams (2.3 moles) of 1,4-butanediol, and 0.173 grams of titanium tetraisopropoxide. The mixture was heated at 210° C. for 2 hours while distilling out methanol. The resulting mixture was heated to 250° C. for 30 minutes and then vacuum was applied for 3 hours. After vacuum was released and replaced with nitrogen, styrene/maleic anhydride copolymer with 75% styrene content and number average molecular weight of 1900 (125.7 grams) was added into the flask. The resulting polymer was stirred for 75 minutes at 250° C., and then was cooled to room temperature to obtain polystyrene/maleic anhydride grafted copolyester with an intermediate molecular weight, I.V. 0.42 dL/g as determined at 25° C. and 0.1% concentration in HFIP/PFP 50/50: Tmp 222° C. (by DSC); heat of fusion 35 j/g; Tg 63° C. This polymer contained 30% of polystyrene and was fiber forming.

EXAMPLE 21

Sidechain Containing Copolyester

In a 1 liter three-necked resin flask equipped with nitrogen inlet and outlet, thermometer, condenser and mechanical stirrer, were placed 194 grams (1 mole) of dimethyl terephthalate, 36.4 grams of ethylene glycol, 10.4 grams (0.1 mole) of neopentyl glycol and 0.173 grams of titanium isopropoxide. The mixture was heated at 210° C. for 2 hours while distilling out methanol. Additional 100 grams of ethylene glycol was added into the flask, and the resulting mixture was heated at 210° C. for an additional 2 hours, and at 250° C. for 30 minutes, and then vacuum was applied for 4 hours. The resulting polymer was cooled to room temperature to obtain copolyester with an intermediate molecular weight, I.V. 0.86 dL/g as determined at 25 degrees and 0.1% concentration in HFIP/PFP 50:50: Tmp 233° C. (by DSC); heat of fusion 5 j/g; Tcco 124° C.; Tg 76.

EXAMPLE 22

Sidechain Containing Copolyester

Following generally the procedure of Example 21, dimethyl terephthalate, 1,4-butanediol and neopentyl glycol are reacted in a mole ratio of 1:0.9:0:1 to prepare a suitable sheath polymer.

EXAMPLE 23

Sidechain Containing Copolyester

In a 1 liter three-necked resin flask equipped with nitrogen inlet and outlet, thermometer, condenser and mechanical stirrer, were placed 194 grams (1 mole) of dimethyl terephthalate, 20.67 grams (0.08 mole) of 1,2-hexadecanediol, 81 grams (0.9 mole) of 1,4-butanediol, and 0.173 grams of titanium tetraisopropoxide. The mixture was heated at 210° C. for 2 hours while distilling out methanol. To the reaction flask, was added 118.8 grams (1.32 moles) of 1,4-butanediol and 58.2 grams of dimer acid, Empol 1061 (Henkel Corporation). The resulting mixture was heated at 210° C. for 2 more hours and then at 250° C. for 30 minutes, and then vacuum was applied for 8 hours. The resulting polymer was cooled to room temperature to obtain elastomeric copolyester with an intermeidate molecular weight, Tm 195°–200° C. (capillary melting point).

The foregoing polymers are merely illustrative of those which may be employed. In general, it is possible to substitute isophthalic acid for a portion of terephthalic acid if a lower melting point is desired, for example, or add a percentage of long chain alcohol in place of ethylene glycol or butane diol. Likewise, it is possible to introduce sidechains into polyesters by including a variety of different monomeric components to the reaction mixture. One particularly suitable component may be dimer acid, that is, as the dimer of oleic acid as it is commonly known. This acid is prepared by the addition reaction of 2 molecules of oleic acid.

Typically, commercially available materials include stabilizers, in the case of polyester, phosphorous stabilizer to sequester the catalyst as well as anti-oxidants, ultraviolet stabilizers and the like. If materials are not purchased with stabilizers already present, they may be added to the extrusion mixtures if so desired.

Filament and Cord Manufacture

Bilayer filaments of the present invention may be manufactured by any suitable technique. Preferred methods include those described in U.S. Pat. No. 4,101,525 to Davis et al for a high modulus low-shrinkage polyester yarn and U.S. Pat. No. 5,256,050 to Davies for bilayer filaments. Particularly preferred fibers and yarns are prepared by way of high stress melt spinning followed by drawing in the solid state. Generally speaking, such yarns have a tenacity of at least 7.5 grams per denier and an initial modulus of at least 100 grams per denier. The individual filaments have a denier of from about 2 to about 15 and yarns are made up of from about 6 to about 600 individual filaments. Filaments and yarn of the present invention are fabricated as described below.

Figure 1:
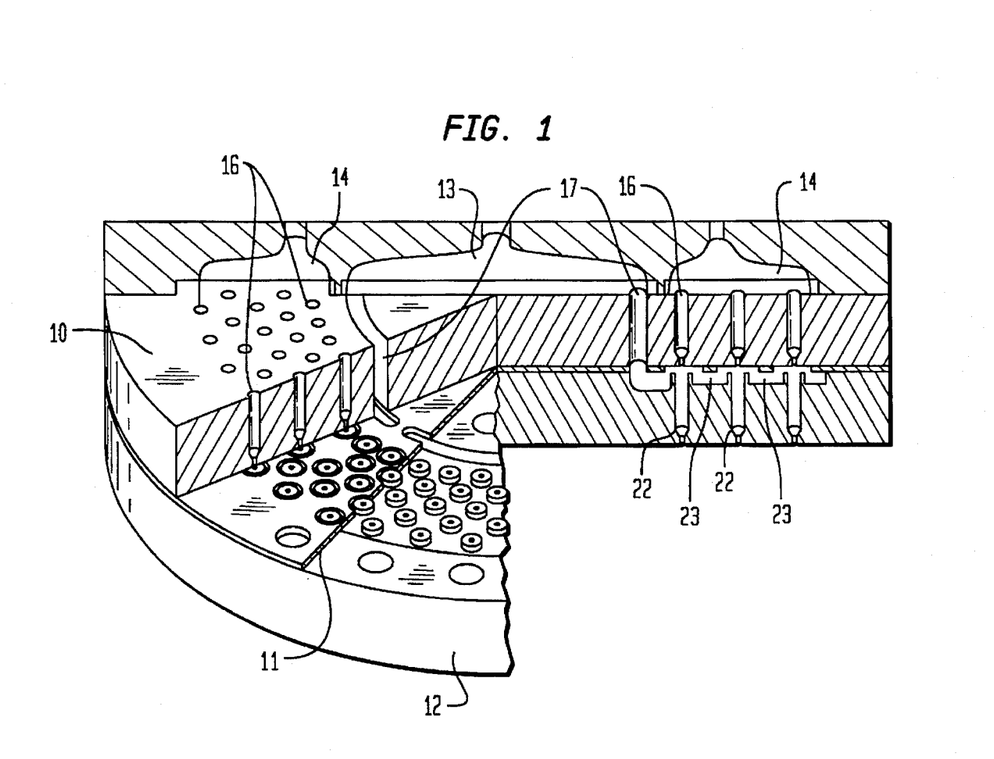
FIG. 1 is a view in perspective and partial section of a spin pack assembly.

Referring to the accompanying drawings and more specifically to FIG. 1, a bicomponent filament spin pack assembly is fabricated from a distributor 10, a shim 11 and a spinneret 12. Distributor 10 is positioned so as to receive a melt-extruded sheath polymer thermoplastic elastomer blend through a channel 13 and a melt-extruded core polymer through channel 14. Each of the sheath mixture and core polymers are passed to the respective channels 13 and 14 by conventional melt extrusion, pump and filter means not herein illustrated.

The distributor 10 functions to form the core polymer into filaments and to channel the flow of sheath polymer mixture to spinneret 12. The core polymer is pumped through multiple passages 16 to the lower, even surface of distributor 10. Passages 16 can be arranged in any number of rows or columns depending upon their size, the viscosity of the core polymer, the length of passages 16 and the flow characteristics of the particular core polymer. The bottom of each passage 16 is tapered to provide a core filament of the desired diameter. Although not to be limited thereto,, the density of passages 16 in the distributor 10 when, for example, the core polymer is melted polyethylene terephthalate and the exit passage diameter is in the range from 0.1 millimeter (mm) to 1.0 mm, can be such that each passage utilizes 10 square mm of the spinneret area.

Sheath polymer thermoplastic elastomer blend mixture flowing through channel 13 is pumped to passages 17 and through passages 17 to spinneret 12. Although not to be limited thereto, the passages 17 are preferably axially positioned in distributor 10 so that upon exiting passages 17 the sheath polymer will flow radially outwardly toward the inlets of passages 22.

Figure 2:
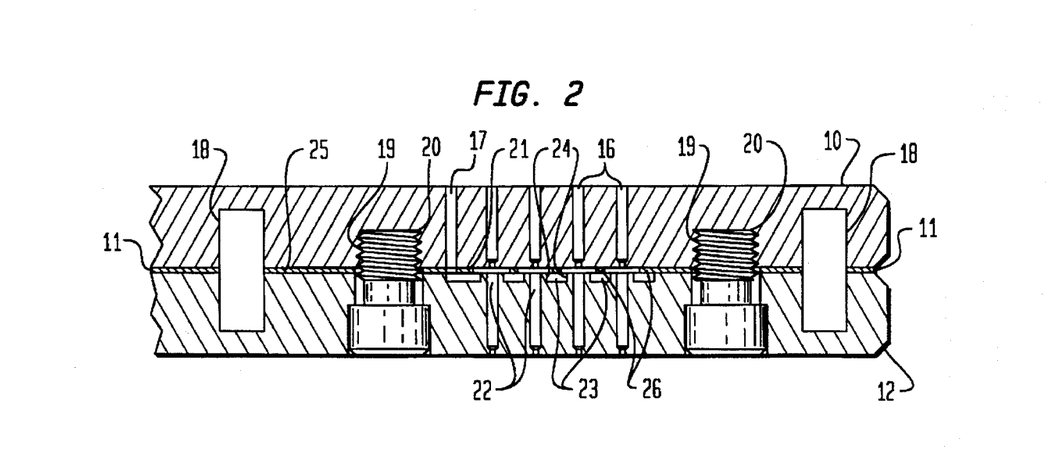
FIG. 2 is a view in vertical section of a portion of the spin pack assembly of FIG. 1.

A shim 11 is positioned between distributor 10 and spinneret 12 and maintained in fixed relationship to distributor 10 and spinneret 12 by bolts 19 engaging threaded recesses 20 in distributor 10. Distributor 10 and spinneret 12 are relatively positioned by dowel pins 18. In order to overcome bowing and separation of distributor 10 and spinneret 12 which can occur in the operation of conventional spin pack assemblies, a ring of bolts 19 has been positioned in the center of the assembly as shown in FIG. 2. The shim can be fabricated from a variety of materials such as stainless steel or brass with stainless steel being preferred. The shim can be constructed as a single unit or in two separate inner and outer pieces. The number and positioning of bolts 19 is such as to control deflection, preferably limiting deflection to less than 0.002 mm.

Shim 11 must be of substantially constant thickness, preferably having a variance in thickness of less than 0.002 mm and the circular openings 21 must be in proper alignment with distributor passages 16 and spinneret passages 22. Shims 11 of different thicknesses, normally ranging from 0.025 to 0.50 mm, are employed to adjust for changes in sheath mixture viscosity, changes in polymer flux or to change the pressure drop.

The top smooth, even surface of the spinneret 12 is recessed, providing a channel 23 for the flow of sheath mixture to each passage 22. Raised circular portions or buttons 24 surround each passage 22. The raised portions or buttons 24 project upwardly from channel 23 to a height which is equal to the top surface 25 of spinneret 12. The rate of outward flow of sheath polymer and thermoplastic elastomer through channel 23 and over the buttons 24 to passages 22 is a result of the pressure drop determined by the thickness of shim 11. The pressure drop is inversely proportioned to the third power of the height of the gap 26 between distributor 10 and spinneret 12. Close control of this gap height is effected by shim 11 and maintained by the inner circle of bolts 19. The recess depth of channel 23 is selected so as to provide a low pressure drop (normally 20–50 psi) radically across the top of the spinneret. The shim thickness is selected to normally provide a 100–1000 psi pressure drop across the raised buttons 24.

As will be evident from the drawings, each passage 22 must be in concentric alignment with its corresponding passage 16. The core polymer flows through passages 16 and passages 22, exiting spinneret 12 as the core of a bicomponent fiber. The sheath polymer and thermoplastic elastomer flows through passages 17, channel 23 and gap 26 to form a sheath about the filament of corn polymer producing the aforementioned bilayer fiber. The center axis of distributor passage 16 should be within a circle having a radius less than 200 microus, preferably less then 50 microns from the center axis of the spinneret counterbore.

Figure 3:
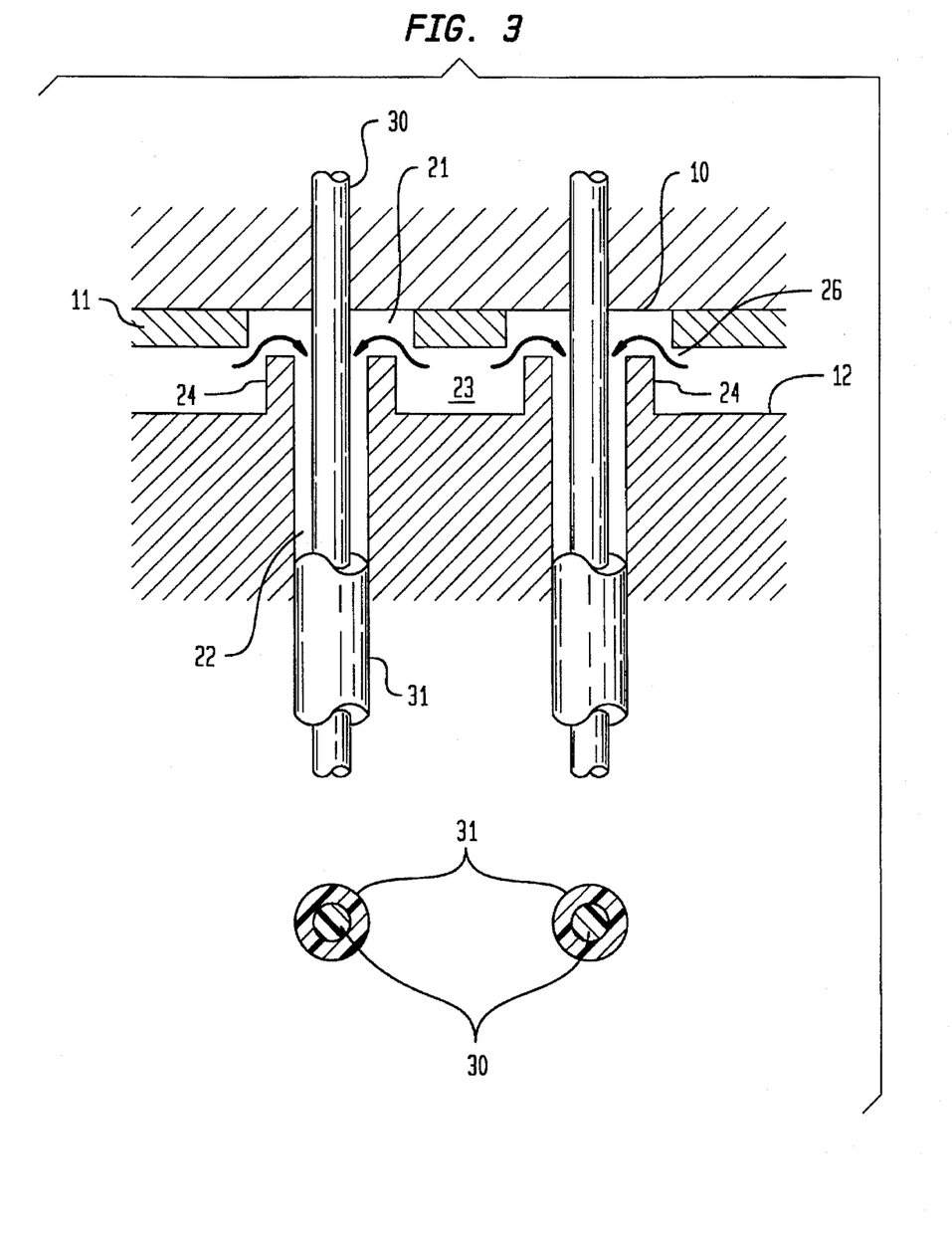
FIG. 3 is a detail in vertical section of a distributor/shim/spinneret assembly to produce concentric sheath/core heterofilaments.

The production of concentric hererofilament fibers is further illustrated in FIG. 3. shim 11 is positioned to cause sheath polymer thermoplastic elastomer blend 31 flowing through channel 23, over buttons 24, and through gap 26 into channel 22, forming a concentric sheath about core polymer 30 as shown.

The sheath polymer and thermoplastic elastomer may be melt-blended and pelleticed prior to extrusion, or the sheath polymer and thermoplastic elastomer may be simply added to the extrusion apparatus in appropriate proportions. The extrusion process melt-blends the components.

Figure 4:
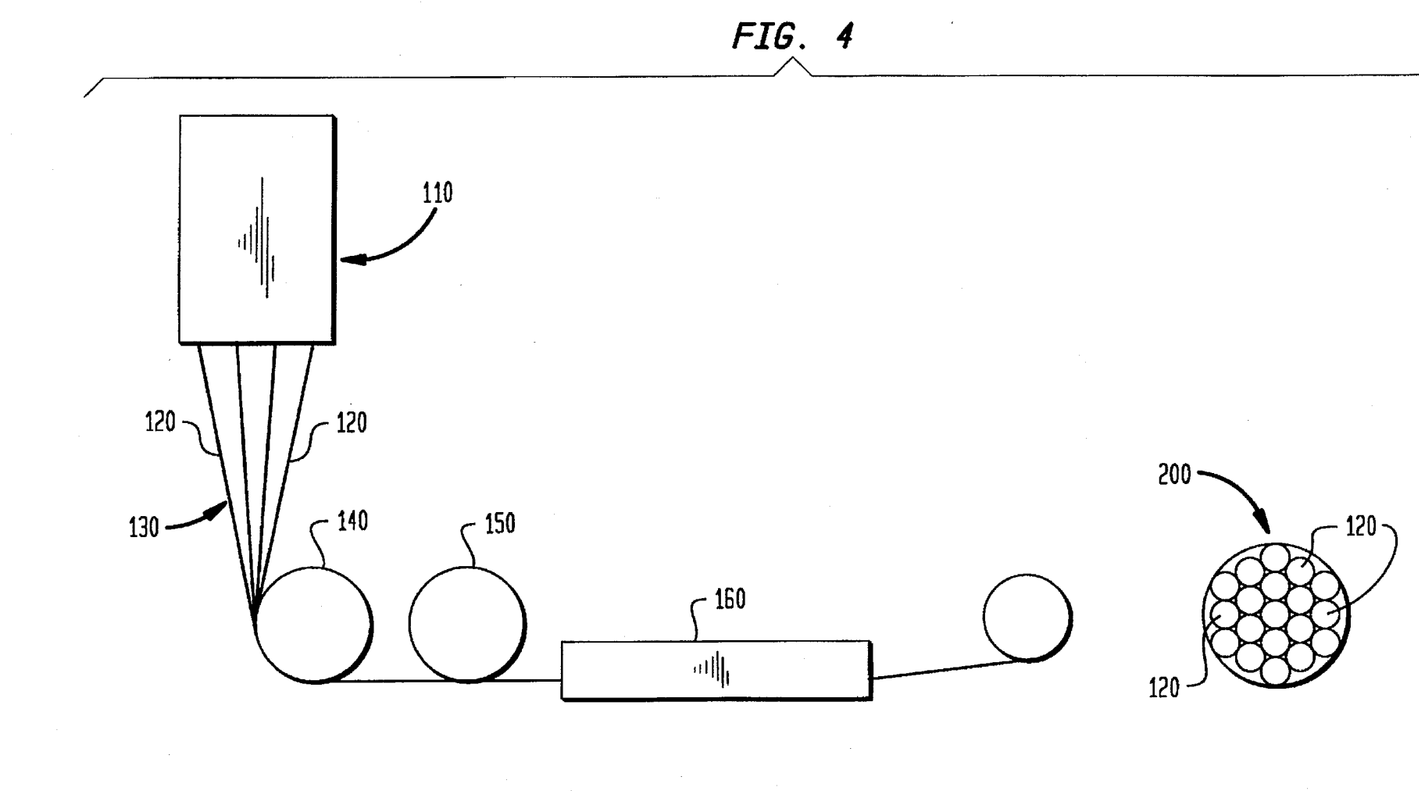
FIG. 4 is a schematic diagram showing the manufacture of fused tire cord.

Following extrusion from apparatus 10, indicated generally in FIG. 4 as apparatus 110, the multiple filaments 120 are melt spun under relatively high stress spinning conditions as described in U.S. Pat. No. 4,101,525 (i.e. a melt drawn down of at least 100:1 and as high as 3000:1, preferably 500:1 to 2000:1). The molten extrudate is solidified in the solidification zone, indicated generally at 130. Following melt solidification, the bilayer filaments are passed between rollers schematically represented as 140, 150 while being treated with steam the solid filaments are further drawn, preferably in multiple drawing steps if so desired, to impart the highest modulus and tenacity to the filaments. Most preferably, the yarn is melt-fused in oven 160 under tension at a suitable temperature to provide the multi-filament structure shown at 200, subsequent to the drawing step.

Generally speaking, the bilayer filaments of the present invention have a sheath: core weight ratio of from about 2:98 to about 30:70. From about 5:95 to 25:75 is more typical and from 10:90 to about 20:80 sheath/core weight milo may be preferred. The sheath composition may be predominately rubber or predominately polymer. A rubber: polymer ratio in the sheath from 99:1 to 1:99 is possible, with from 95:5 to 5:95 more typical. From 70:30 to 30:70 may be the most preferred range depending on the composition. Following the procedures described above, fused cord having the composition indicated below in Table 3 is produced.

TABLE 3

Fused Cord Compositions

| A<br>Core Polymer | B<br>Sheath Polymer | C<br>Sheath Rubber | Weight Ratio<br>A:B:C |
| --- | --- | --- | --- |
| Poly(ethylene terephthalate) | Ex. 1 Copolyester | Kraton D-1111 | 80:5:15 |
| Poly(ethylene terephthalate) | Ex. 22 Copolyester | Kraton D-1102 | 80:15:5 |
| Polyamide of Terephthalic acid and 2-methyl-1,5 pentane diamine | Nylon 6 | Kraton D-1111 | 80:15:5 |
| Poly(ethylene terephthalate) | Melt blend, equal parts of poly(ethylene terephthalate) and copolyester of Example 5 | Kraton D-1117 | 80:10:5 |
| Poly(ethylene terephthalate-co-bibenzoate) | Ex. 15 Copolyester | Kraton G-1652 | 80:5:15 |
| Poly(ethylene terephthalate) | Copolyester of Example 19 | Melt-blend of polyisoprene and styrene butadiene rubber, equal parts by weight | 75:15:10 |
| Poly(ethylene terephthalate) | Copolyester of Example 17 | Polyisoprene | 80:10:10 |

We claim:

1. A heterofilament fiber for industrial yarns comprising a core formed of a thermoplastic fiber-forming core polymer selected from the group consisting of polyesters and polyamides and a thermoplastic sheath concentrically disposed about said core and adhered thereto, said thermoplastic sheath comprising a rubber blended with a thermoplastic sheath polymer, wherein said sheath polymer is a polyester which is fully melted at a temperature at least 5° C. lower than the crystalline melting point of said core polymer when said core polymer is a polyester, and wherein further said sheath polymer is a polyamides which is fully melted at least 5° C. lower than the crystalline melting point of said core polymer when said core polymer is a polyamide.

2. The heterofilament fiber according to claim 1, wherein the melting point of said sheath polymer is fully melted from 5° C. to 150° C. lower than the crystalline melting point of said core polymer.

3. The heterofilament fiber according to claim 2, wherein the melting point of said sheath polymer is fully melted from 10° C. to 100° C. lower than the crystalline melting point of said core polymer.

4. The heterofilament fiber according to claim 3, wherein said sheath polymer is fully melted from 15° C. to 50° C. lower than the crystalline melting point of said core polymer.

5. The heterofilament fiber according to claim 1, wherein at least one of said core or sheath polymers is synthesized using a reactant selected from the group consisting of 1,4 butane diol, cis-cyclohexanedimethanol, trans-cyclohexanedimethanol; isophthalic acid, and dimer acid.

6. The heterofilament fiber according to claim 1, wherein said core polymer is a linear polyester of one or more aromatic diacids and an alkyl glycol.

7. The heterofilament fiber according to claim 6, wherein said core polymer is synthesized using at least two aromatic diacids selected from the group consisting of terephthalic acid, 4,4'bibenzoic acid, and 2,6-naphthalene dicarboxylic acid.

8. The heterofilament fiber according to claim 6, wherein said alkyl glycol is ethylene glycol.

9. The heterofilament fiber according to claim 1, wherein said rubber is a block copolymer.

10. The heterofilament fiber according to claim 9, wherein said poly(styrene-elastomer-styrene) elastomer is selected from the group consisting of poly(styrene-butadiene-styrene) elastomers and poly(styrene-isoprene-styrene) elastomers.

* * * * *